(12) United States Patent
Farrish

(10) Patent No.: US 9,334,184 B2
(45) Date of Patent: May 10, 2016

(54) UPFLOW ALGAE SCRUBBER EMBODIMENTS: GAS BUBBLE DIVIDER

(71) Applicant: Bryan Harold Farrish, Santa Monica, CA (US)

(72) Inventor: Bryan Harold Farrish, Santa Monica, CA (US)

(*) Notice: Subject to any disclaimer, the term of this patent is extended or adjusted under 35 U.S.C. 154(b) by 208 days.

(21) Appl. No.: 14/269,111

(22) Filed: May 3, 2014

(65) Prior Publication Data

US 2015/0315051 A1 Nov. 5, 2015

(51) Int. Cl.
*B01F 3/04* (2006.01)
*C02F 3/00* (2006.01)
*C02F 3/32* (2006.01)
*A01K 63/04* (2006.01)
*A01G 33/00* (2006.01)

(52) U.S. Cl.
CPC .............. *C02F 3/322* (2013.01); *A01G 33/00* (2013.01); *A01K 63/04* (2013.01); *A01K 63/042* (2013.01); *B01F 3/04106* (2013.01); *C02F 2203/006* (2013.01); *C02F 2303/20* (2013.01)

(58) Field of Classification Search
CPC .... B01F 3/04; B01F 3/04099; B01F 3/04106; B01F 2003/04127; B01F 2003/04134; C02F 3/00; C02F 3/322
USPC ............ 261/119.1, 121.1, 123, 126; 210/150, 210/220; 47/1
See application file for complete search history.

(56) References Cited

U.S. PATENT DOCUMENTS

| | | | |
|---|---|---|---|
| 6,017,020 A * | 1/2000 | Baughman | B01F 3/04106 261/122.1 |
| 2010/0170151 A1* | 7/2010 | Huber | A01K 63/042 47/1.4 |

* cited by examiner

*Primary Examiner* — Robert A Hopkins

(57) ABSTRACT

An apparatus for gas bubble division and distribution to an upflow algae scrubber, an embodiment of which comprises a gas bubble divider edge and a set of gas bubble corridors open on either their bottom or sides.

20 Claims, 4 Drawing Sheets

UPFLOW ALGAE SCRUBBER EMBODIMENTS: GAS BUBBLE DIVIDER

FIELD

An embodiment of the invention generally relates to a gas bubble divider which distributes gas bubbles across macroalgal attachment surfaces in an upflow algae scrubber. Other embodiments are also described.

BACKGROUND

Many industries such as aquaria, aquaculture, wastewater, and pool/spa rely on "clean" water for their proper operation. In the current application, "clean" is meant to mean water that is low in nutrients, specifically: Inorganic Nitrate, Inorganic Phosphate, Nitrite, Ammonia, Ammonium, and metals such as Copper. These nutrients cause problems in water such as excessive algae and bacteria growth, and in some cases, poisoning of livestock. Livestock in aquaria (freshwater, brackish or saltwater) are especially sensitive to high nutrients, and thus the nutrients must continuously be removed. Saltwater reef aquaria, in particular, are extremely sensitive to contaminants such as copper; the slightest trace of copper will kill most corals in such aquariums.

For water filtering, the challenge has been how to grow algae easily so the algae can be removed (harvested), which removes the nutrients from the water. If the algae are not removed, they will simply die and put nutrients back into the water. The history of attempting to grow algae falls into two main algae categories: Uni-cellular and Multi-cellular growth. Uni-cellular algae are microscopic organisms which drift freely in the water (like plankton), and they give the water a tint which is usually green; thus they are usually called "micro" algae or "phyto" plankton. Multi-cellular algae are seaweeds; they usually attach themselves to a surface. And since multi-cellular seaweeds are much larger than microalgae, they are usually called "macro" algae.

A practical use for algal growth is for consumer use; "seaweed" and "sea vegetable" are the preferred names when consumers use algae (seaweed is also the only vegetable from the ocean). Skin care wraps and baths, natural medicines, gardening fertilizers, beer/wine fermentations, and foods such as nor dulse, and seaweed salads are all uses in which consumers require seaweed, preferable freshly grown. These home uses of seaweed (macroalgae) have grown greatly in recent years, however there has never been a feasible way for consumers to grow their own seaweed because of the need for large amounts of water flow and gas bubble flow, in a compact unit for household use.

When these multi-cellular macroalgae seaweeds are grown as a product, or grown for filtering, they attach themselves to solid surfaces and tend to clump together and route water and gas bubbles away from the clumps. However these clumps are the areas which are most in need of the nutrients provided by water and gas bubble flow. Therefore there is a need for a water and gas bubble delivery system which provides sufficient water and gas bubble flow throughout the macroalgal growth area.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
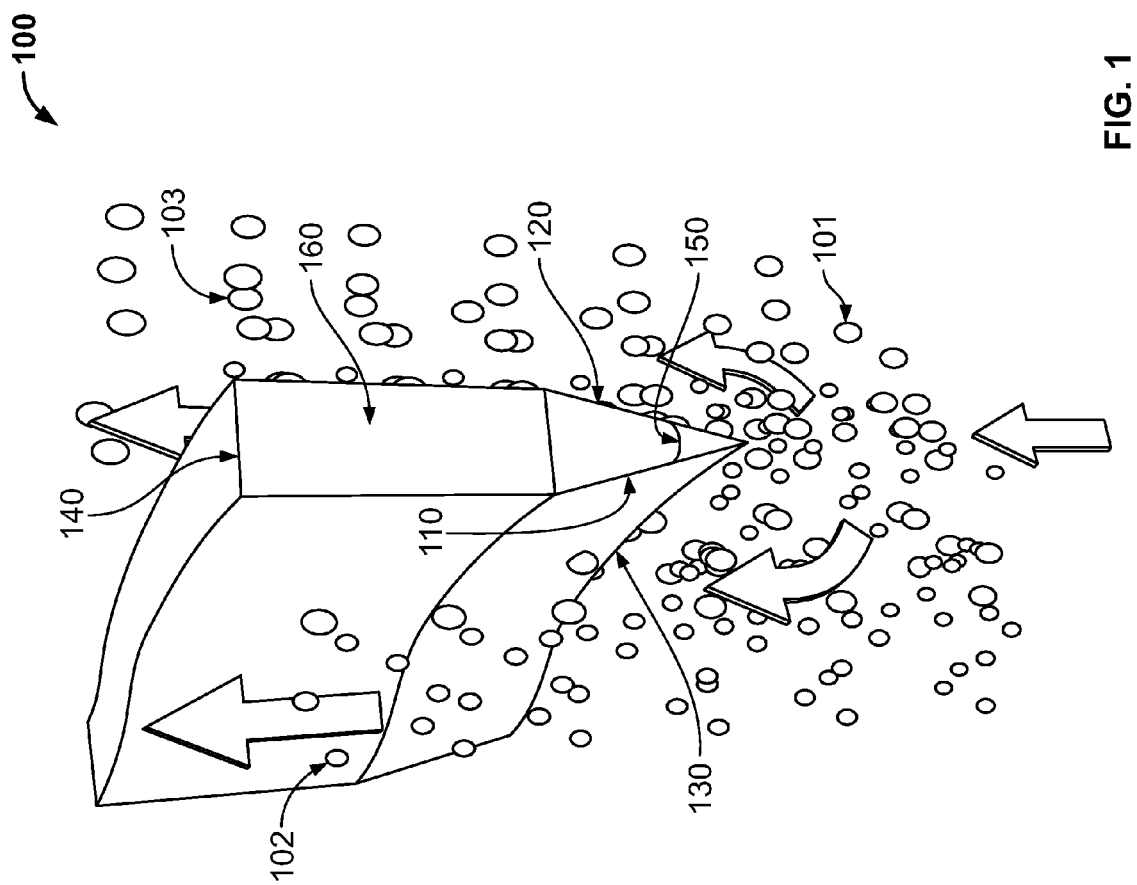
FIG. 1 shows a perspective closeup view of a an embodiment of the current invention

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

There are many methods and devices in the art which are designed to remove nutrients from water. Some of these use light to grow photosynthetic algae purposely, thus removing the nutrients; this removal is hereafter termed "scrubbing", and is done by a "scrubber". Since algae thrive and grow by consuming said nutrients, the algae become a filter by scrubbing these nutrients from the water as the algae grow. Some of these algae-growing devices use upflowing gas bubbles to deliver nutrients and turbulence to algal-attachment surfaces; these devices are termed upflow algae scrubbers within the present application.

One area where an upflow algae scrubber or upflow seaweed cultivator has required attention in order to build compact household units is the gas bubble delivery means. Gas bubbles are a necessary component of upflow algae scrubbers or upflow seaweed cultivators because the bubbles deliver CO2 (which is in the air) to the growth, and, the air/water interface of the bubble's surface breaks up the boundary layers of water surrounding the algae, allowing nutrients to flow into and out of the algae more effectively. Lastly, large gas bubbles physically move the algae strands around, allowing more circulation of water and light through the growth. Gas bubbles are preferred to be distributed throughout the growth area, such that few or no sections of growth go without an uprising column of gas bubbles. The present invention provides for such a distribution of gas bubbles economically.

If a prior-art airstone or woodblock is used to deliver the bubbles to the macroalgae, the small holes in the airstone or woodblock will eventually become clogged, especially if the holes receive light from the algae scrubber/cultivator lighting system. Repair of a clogged airstone usually involves replacing it with a new one, or soaking it in acid. If open-ended gas tubings are used instead, the labor required to install the tubings can become excessive if more than just a few tubings are needed, and clogging of the tubing openings can still occur, requiring the insertion of a cleaning object into the tubing openings. This insertion tends to push the clog further into the tubing, causing long-term maintenance problems. The present invention is resistant to clogging, because all gas passages are very large in comparison to the tiny holes in an airstone or woodblock. The present invention also allows for very easy cleaning because all gas passages are open corridors (open on either the bottom or the side), allowing the user to simply brush obstructions out of the gas passages. There are no small orifices to clog.

If airlifts are used below an algae scrubber/cultivator in order to deliver more water flow to the macroalgae, a separate narrow vertical tube is usually required for each airlift; more than just a few of these airlift tubes can become cumbersome and expensive to construct. Using the gas bubble divider of the present invention, a single airlift tube can be used whereby the output at the top of the tube is divided and the resulting output is delivered to the different sections of the upflow algae scrubber or cultivator.

The present invention thus enables few or just one gas supply component to be used to supply gas to a large size of macroalgal attachment surface or macroalgal growth area, while at the same time reducing clogging of the gas passages and allowing easy cleaning access to the passages without any disassembly required.

At first it was thought that using a gas bubble divider would cause a circular motion inside the algae scrubber, because as bubbles emerged in one area it would circulate the water down in another area and prevent bubbles from emerging there. While this can happen at first, when the algae does finally grow, the growth surprisingly dampens the swirls and allows bubbles to emerge from all areas.

FIG. 1 shows an embodiment 100 of the current invention. When this embodiment is placed into service in an aquarium, pond, or cultivator environment, a rising column of gas bubbles 101 and water, supplied by another means, approaches the gas bubble divider component 160 which has a first surface 110 on the left side of the drawing and a second surface 120 on the right side. First surface 110 and second surface 120 are separated by distance 140 and meet at first gas bubble divider edge 130 which has a radius R. In this drawing the radius R of first gas bubble divider edge 130 is very small in relation to distance 140, and thus might appear "sharp" like a knife edge, however a larger and more rounded radius R is also possible as shown by arc 150, especially if separation distance 140 is larger than approximately 1 cm. Typical values for radius R might be 1-10 mm for aquarium applications, and distance 140 could be any distance that suits the structure of gas bubble divider 100, such as 2 mm, or 1 cm, or 2 cm.

As the gas bubble column 101 impacts the first gas bubble divider edge 130, a first portion of gas bubbles 102 routes upwards along first surface 110 to one section of upflow algae scrubber macroalgal attachment surface (not shown) positioned above the gas bubble divider embodiment 100, whereas the remaining portion of gas bubbles 103 routes upwards along second surface 120 to another section of upflow algae scrubber macroalgal attachment surface (also not shown) positioned above the gas bubble divider 100. Gas bubble divider 100 can be a separate apparatus placed beneath an upflow algae scrubber, or it can be built into and included with the upflow algae scrubber.

Gas bubble dividing component 160 can be any non-corrosive material, including flexible material, which holds it's operational shape when impacted by an upflowing column of gas bubbles 101. Suitable materials might be plastic or fiberglass, or if shorter-term operation is acceptable, rubber. It is envisioned that the embodiment could also include hinges, which would allow the embodiment to be folded for easy storage or shipping. It is preferred that the materials have a smooth surface such that algae will not be encouraged to attach to it. Gas bubble divider component 160 can be any shape which successfully divides the rising column of gas bubbles 101 into two portions 102 and 103, such that each portion can be delivered to a different section of an upflow algae scrubber's macroalgal attachment surfaces (not shown) which would be positioned above the gas bubble divider component 160. For example, gas bubble dividing component 160 could be straight, or curved in the vertical or horizontal directions, or both. Gas bubble divider component thickness 140 can be any thickness which successfully keeps gas bubble portions 102 and 103 separated as the portions proceed upwards towards the separate sections of upflow algae scrubber growth areas above gas bubble dividing component 160.

Gas bubble divider embodiment 100 might be comprised of a gas bubble dividing component 160 defining a first surface 110, the first surface 110 terminating in a first gas bubble divider edge 130 configured to divide an upflowing mixture of water and gas bubbles 101 into two portions, a first portion 102 of which would travel along and be guided by the first surface 110 to a first section of an upflow algae scrubber, wherein the distribution pattern for gas bubble delivery to the upflow algae scrubber would be widened. Gas bubble dividing component 160 might further define a second surface 120 terminating in the first gas bubble divider edge 130, the second surface 120 configured to allow a second portion of water and gas bubble mixture 103 to flow along and be guided by the second surface 120 to a second section of the upflow algae scrubber.

Figure 2:
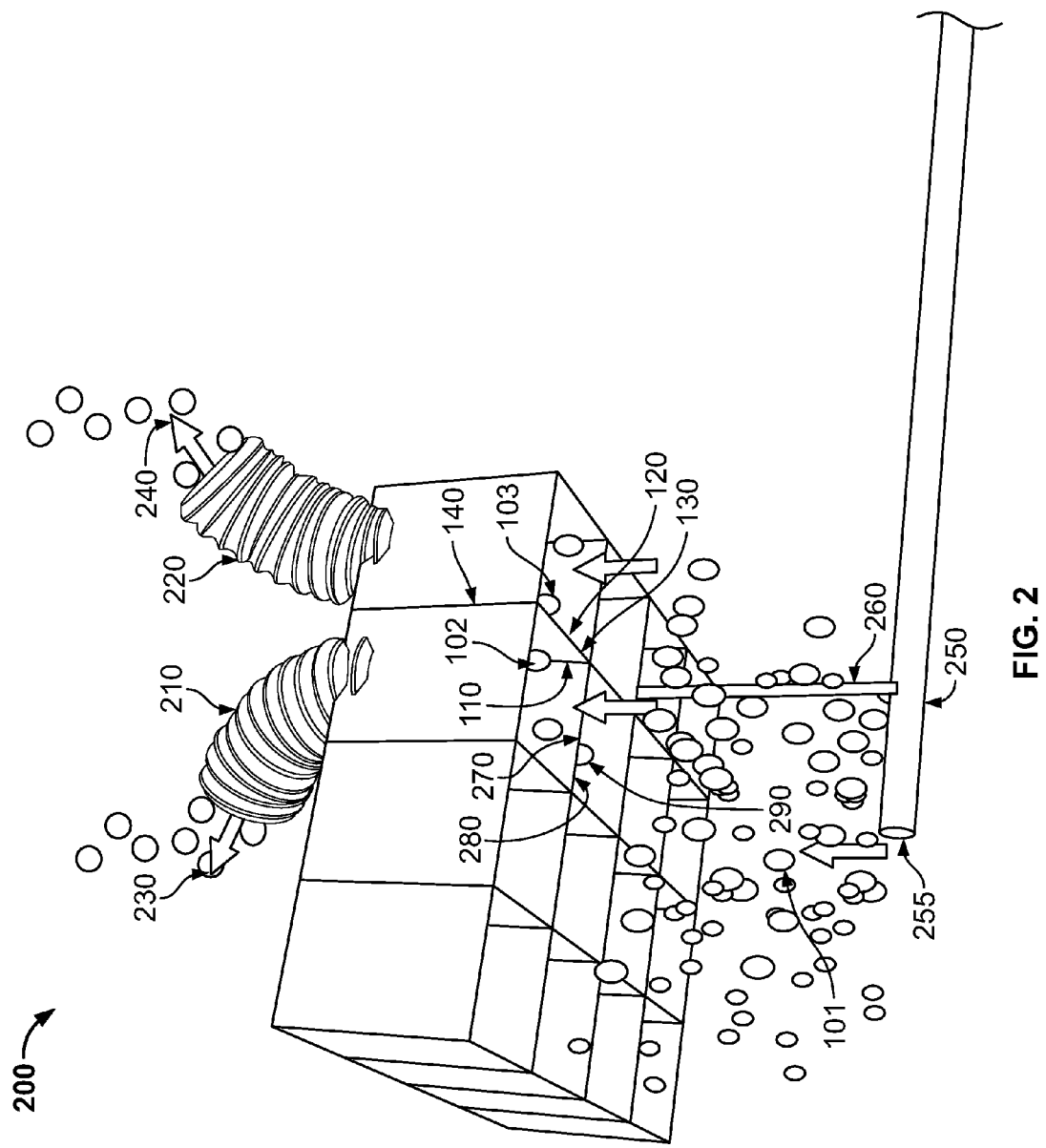
FIG. 2 shows a perspective view, looking upwards, of another embodiment of the current invention

FIG. 2 shows another embodiment 200 of the current invention. This embodiment has a set of intersecting surfaces in order to divide an upflowing water and gas bubble mixture 101 into smaller portions. First surface 110, and second surface 120 (hidden in this drawing), form gas bubble divider edge 130 which has radius R, and the distance between first surface 110 and second surface 120 in this drawing is very small, thus appearing to be "paper thin". It should be understood however that the distance between first surface 110 and second surface 120 (shown as label 140 in FIG. 1) could be any size or thickness, including being two separate walls that are hollow between them, so long as they connect at and form gas bubble divider edge 130. And in the case of a larger distance between first surface 110 and second surface 120, the radius R of gas bubble divider edge 130 could be larger also (e.g., more rounded), or could still be very small as in FIG. 2, which makes it similar to a knife edge. It is also envisioned that the surfaces of embodiment 200 could be hinged and folded for easy storing or shipping.

Gas bubble divider 200 is positioned above an upflowing water and gas bubble 101 mixture. The mixture 101 might be emitted from another component (not shown), or supplied by a gas inlet 255 from gas supply component 250, which could possibly be held in position by a bracket or other component or means 260. Gas inlet 255, gas supply component 250, and attachment means 260 could also be integrated into the overall structure of gas bubble divider 200, including the positioning of gas supply component 250 within or on the structure or walls of gas bubble divider 200. Gas passages could also be built into gas bubble divider 200 using techniques such as injection molding or 3D printing, such that gas supply component 250 is a network or matrix of gas passages within the walls or structure of gas bubble divider 200.

As the water and gas bubble 101 mixture travel upward and impact the gas bubble divider edge 130, a first portion of the mixture 102 is separated by the gas bubble divider edge 130 and flows upwards and is guided by first surface 110 into corridor 210 which subsequently guides the mixture to a section of an upflow algae scrubber (not shown) above gas bubble divider 200 in the direction of arrow 230. A second portion of the mixture 103 is separated by the gas bubble divider edge 130 and flows upward and is guided by second surface 120 into corridor 220, which subsequently guides the mixture to a section of the upflow algae scrubber (not shown) in the direction of arrow 240. Corridors 210 and 220 can be any devices or mechanisms in the art which can route water and gas bubbles, such as plastic or vinyl tubing, and they can be enclosed passages (such as the round pipes shown) or they can be approximately horizontal passages with open bottom sections so as to allow for easy cleaning from beneath.

The set of intersecting surfaces in embodiment 200 further divides the upflowing water and gas bubble mixture 101 into smaller portions to be delivered to still further sections of the upflow algae scrubber (not shown), separate from the sections delivered by conduits 210 and 220. For example, third surface 270, whose face is forward in this drawing, intersects first surface 110. Embodiment 200 shows this intersection at approximately 90 degrees, however it is contemplated that it could be any degree of intersection, such as 20, 40 or 60 degrees. The bottom of third surface 270 terminates at second gas bubble divider edge 280, which has radius R. It is shown that second gas bubble divider edge 280 meets first gas bubble divider edge 130, however it is contemplated that the set of gas bubble divider edges not be required to meet each other; e.g., first gas bubble divider edge 130 could be higher or lower than second gas bubble divider edge 280, as long as surfaces 110 and 270 intersect.

As water and gas bubble first portion 102 travels upward, it is further divided by second edge 280 such that yet another portion 290 of mixture travels up yet another corridor (not shown) to yet another section of the upflow algae scrubber. The number of water and gas bubble divider surfaces, edges, and associated conduits can be any number needed to divide the upflowing water and gas bubble mixture 101 into sufficiently smaller portions such that upflow algae scrubber growth surfaces (not show) which are above embodiment 200 are adequately supplied with nutrients to grow.

The apparatus 200 for gas bubble delivery might be comprised of a gas bubble dividing component defining a first surface 110, the first surface 110 terminating in a first gas bubble divider edge 130 configured to divide an upflowing mixture of water and gas bubbles 101 into two portions, a first portion 102 of which would travel along and be guided by the first surface 110 to a first section of an upflow algae scrubber, wherein the distribution pattern for gas bubble delivery to the upflow algae scrubber would be widened. The gas bubble dividing component might further define a second surface 120 terminating in the first gas bubble divider edge 130, the second surface 120 configured to allow a second portion of water and gas bubble mixture 103 to flow along and be guided by the second surface 120 to a second section of the upflow algae scrubber. The gas bubble dividing component might also further define a third surface 270 terminating in a second gas bubble divider edge 280, the third surface 270 intersecting the first surface 110, and the second gas bubble divider edge 280 configured to divide the first portion of water and gas bubble mixture 102 into two smaller portions 290, such that each smaller portion 290 would be directed to a different section of the upflow algae scrubber. Lastly the apparatus 200 for gas bubble delivery might further comprise a gas supply component 250 terminating in a gas supply inlet 255, with a coupling mechanism 260 to align the gas supply inlet 255 with the first gas bubble divider edge 130 such that gas bubbles 101 emitted from the gas supply inlet 255 are directed to travel to the first gas bubble divider edge 130. The radius R of gas bubble divider edge 130 could be approximately 1-10 mm.

Figure 3:
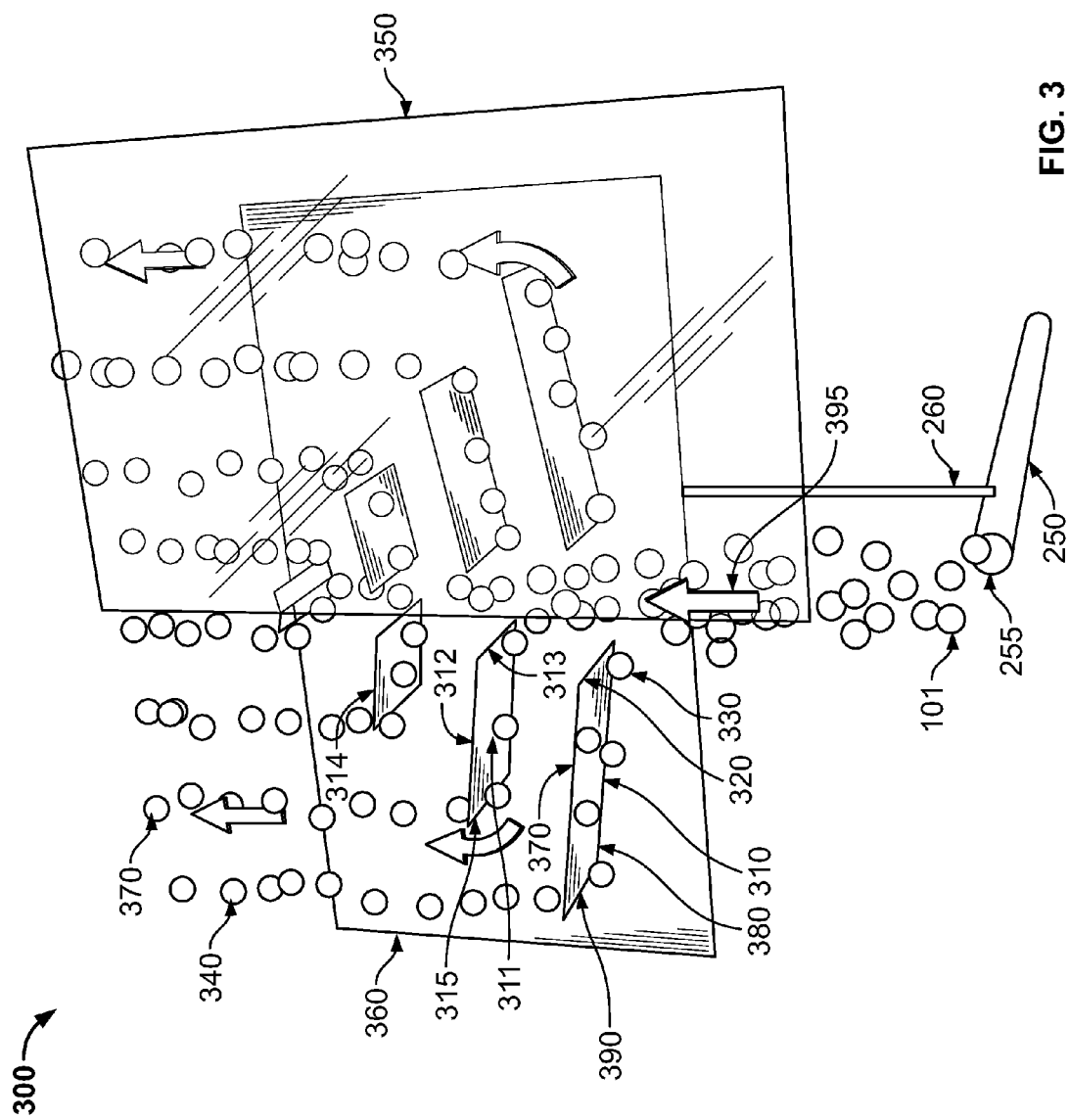
FIG. 3 shows a perspective view of another embodiment of the current invention

FIG. 3 shows another embodiment 300 of the current invention, possibly suited to being positioned against an approximately vertical transparent or translucent wall 350 such as a glass or acrylic/perspex aquarium wall. Embodiment 300 is to be placed above a rising column of gas bubbles 101 and water mixture, which would flow upwards approximately centered on arrow 395. The gas bubbles might be emitted from another component (not shown) or could be supplied by a gas inlet 255 of gas supply tubing 250, possibly held in position by a bracket or other component or means 260 similarly to FIG. 2. As the rising column of gas bubbles 101 approaches the set of upper surfaces 310, 312 and 314, the outermost portion 330 of the gas bubbles 101 is separated by the gas bubble divider edge 320 of upper surface 310, and this portion of gas bubbles 330 travels laterally (leftwards in this drawing) towards the opposite edge 390, and then turns upwards into a column of gas bubbles 340 which will be delivered to a section of an upflow algae scrubber macroalgal attachment surface (not shown) positioned above the bubble divider component 300. In a similar fashion, the next innermost portion 311 of the gas bubbles 101 is separated by the gas bubble divider edge 313 of upper surface 312, and this portion of gas bubbles 311 travels laterally towards the opposite edge 315 and then turns upwards into a column of gas bubbles 370 which will be delivered to a section of the upflow algae scrubber macroalgal attachment surface different from column 340. In a similar fashion, the next innermost portion of the gas bubbles 101 is separated by the gas bubble divider edge of upper surface 314 and delivered to yet another section of the upflow algae scrubber macroalgal attachment surface above embodiment 300. Lastly, as the above describes the invention using the set of upper surfaces 310, 312 and 314 on the left side of embodiment 300, another set of upper surfaces could also be used on the right side of embodiment 300, as shown.

A useful application of embodiment 300 is when the illumination source (not shown) for the upflow algae scrubber (also not shown) is outside of the aquarium glass, providing illumination through the aquarium glass to an upflow algae scrubber which is inside the aquarium (in the water). FIG. 29 of co-pending application PCT/US12/71484 shows an example of this. In this case the front half of the in-water portion of the upflow algae scrubber is open and pressed up against the aquarium glass wall, and the entire unit is removed for cleaning. Embodiment 300 of the present invention can fit underneath the in-water portion of FIG. 29 of co-pending application PCT/US12/71484 and not only provide visibility for the user to observe proper gas bubble flow, but also to allow easy no-disassembly cleaning when the in-water portion is lifted out of the water. This utility is shown in embodiment 300 in FIG. 3 by transparent or translucent wall 350 pressed against the front of the set of upper surfaces on the right side of embodiment 300. Although transparent or translucent wall 350 is shown only on the right side of embodiment 300, it is understood that transparent or translucent wall 350 could just as easily span across the entire embodiment 300; in such a case, transparent or translucent wall 350 would be pressed against the front edges of the set of upper surfaces 310, 312 and 314; for example, front edge 370 of upper surface 310 would be pressed up against transparent or translucent wall 350. Operationally, the fit of the transparent or translucent wall 350 against the front edges of the set of upper surfaces 310, 312 and 314 would be such that the majority of gas bubbles traversing along the upper surfaces 310, 312 and 314 would travel to the ends of the upper surfaces (e.g., to outer edge 390) instead of going in-between the glass and the front edges (e.g., instead of going in-between transparent or translucent wall 350 and front edge 370).

The apparatus 300 for gas bubble delivery might be comprised of a gas bubble dividing component defining a first set of upper surfaces 310, 312, 314, each upper surface 310 terminating in a gas bubble divider edge 320 positioned approximately above or below another gas bubble divider edge 313, and each gas bubble divider edge 320, 313 configured to divide an upflowing mixture of water and gas bubbles 101 into a first set of portions 330, 311 which would be guided by the first set of upper surfaces 310, 312 into separate sections of an upflow algae scrubber (not shown) placed above the gas bubble divider apparatus 300, wherein the distribution pathway for gas bubble delivery to the upflow algae scrubber is widened, and the open front section allows for easy cleaning without disassembly. The apparatus 300 for gas bubble delivery might be configured such that gas bubble divider edges 320, 313 which are progressively higher in the first set of gas bubble divider edges 320, 313 are positioned progressively farther towards the center 395 of the area configured to accept an upflowing water and gas bubble mixture 101 than lower gas bubble divider edges 320, 313 are. The apparatus 300 for gas bubble delivery might have a first set of upper surfaces 310, 312, 314 which are approximately horizontal in both planes. The apparatus 300 for gas bubble delivery might have a first set of upper surfaces 310, 312, 314 which are sloped upwards as the distance from the center 395 of the area configured to accept an upflowing water and gas bubble mixture 101 increases. The gas bubble dividing component might further define a second set of upper surfaces, each upper surface terminating in a gas bubble divider edge positioned approximately above or below another gas bubble divider edge, and each gas bubble divider edge configured to further divide an upflowing mixture of water and gas bubbles 101 into a second set of portions which would be guided by the second set of upper surfaces into separate sections of the upflow algae scrubber. The apparatus 300 for gas bubble delivery might be configured wherein the front 370 of each upper surface 310 is to be operated while placed against a transparent or translucent wall 350. The apparatus 300 for gas bubble delivery might have a radius R of gas bubble divider edge 320 of approximately 1-10 mm. The apparatus 300 for gas bubble delivery might further comprise a gas supply component 250 terminating in a gas supply inlet 255, with a coupling mechanism 260 to align the gas supply inlet 255 with the first set of gas bubble divider edges 320, 313 such that gas bubbles 101 emitted from the gas supply inlet 255 are directed to travel to the first set of gas bubble divider edges 320, 313.

Figure 4:
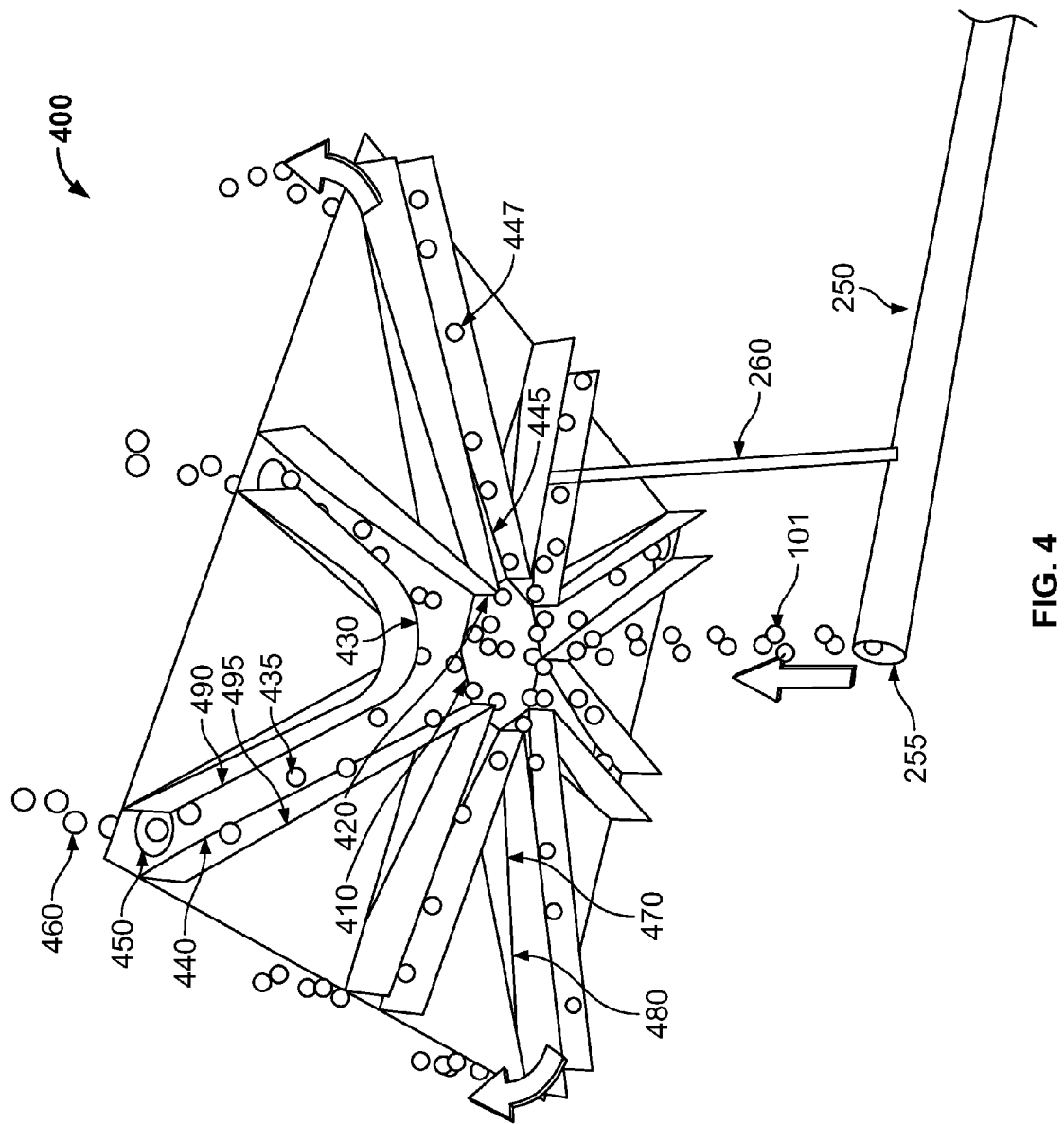
FIG. 4 shows a perspective view, looking upwards, of another embodiment of the current invention

FIG. 4 shows another embodiment 400 of the present invention which can be placed above a column of gas bubbles 101; these gas bubbles 101 might be emitted from another component (not shown) or supplied by a gas inlet 255 of gas supply component 250, possibly held in position by a bracket or other component or means 260. As gas bubbles 101 reach the gas bubble divider embodiment 400, they first contact a gas-supply-section top surface 410; gas-supply-section top surface 410 is capable of being in fluid communication with a set of attached corridor top surfaces, e.g. 440 and 445, and thus can "supply" gas to them when submerged in water. Using corridor top surface 440 as an operational example, rising gas bubbles 101 spread out laterally across gas-supply-section top surface 410, coming into contact with gas bubble divider edge 430 which has radius R; a first portion 435 of these gas bubbles is divided by gas bubble divider edge 430 and flows along corridor upper surface 440. This first portion 435 of gas bubbles is kept aligned to corridor upper surface 440 by corridor side surfaces 490 and 495 until the first portion of gas bubbles 435 reach gas bubble outlet 450, at which point the first portion of gas bubbles 435 turns upwards through gas bubble outlet 450 and creates an uprising gas bubble column 460 which then enters an upflow algae scrubber growth compartment (not shown) above embodiment 400 and rubs against the macroalgal attachment surfaces therein. The uprising gas bubbles 101 are further divided by gas bubble dividing edge 420 into a second portion of gas bubbles 447 which flow along corridor upper surface 445. The radius R of gas bubble divider edge 420 in this drawing is much smaller than the radius R of gas bubble divider edge 430; Radius R of any gas bubble divider edge could possibly be in the range of 1-10 mm, or 10-50 mm Corridor upper surfaces (e.g. 440 and 445) may be planar or non-planar, and may be horizontally level in both planes or may be sloped upwards in one or more planes. If sloped upwards in one or more planes such as the two locations 470 and 480 illustrate, the overall slope will be such that gas bubbles are encouraged to travel from the gas-supply-section top surface 410 towards the gas outlets (e.g. 450). It is also understood that corridor upper surfaces (e.g. 440 and 445), together with their attached side surfaces (e.g. 490 and 495), may form straight pathways as shown in embodiment 400 or may form winding, zig zag, curved, or other pathways from gas-supply-section top surface 410 to the gas outlets (e.g. 450). Corridor side walls 490 and 495 might be 5 mm apart, or 10 mm apart, or 20 mm apart from each other. Gas outlets 450 might be 5-10 mm in diameter for aquarium application; this size will not clog with algal growth as easily as smaller diameters would. Larger diameters and shapes of gas outlets 450 are also contemplated.

The apparatus 400 of gas bubble delivery might comprise a gas bubble dividing component defining a set of corridor upper surfaces 440, 445, each corridor upper surface 440, 445 configured to be capable of fluid communication with a gas-supply-section upper surface 410, and each corridor upper surface 440, 445 having two attached corridor side surfaces 490, 495 each terminating in a gas bubble divider edge 420, 430 at the gas-supply-section upper surface 410 and configured to divide upflowing gas bubbles 101 in the gas-supply-section upper surface 410 into separate portions 435, 447 by the gas bubble divider edges 420, 430 such that each portion of gas bubbles 435, 447 would be directed by the corridor side surfaces 490, 495 to travel along the corridor upper surface 440, 445 in a pathway from the gas-supply-section upper surface 410 to a gas bubble outlet 450, wherein the distribution pathway for gas bubble delivery to an upflow algae scrubber is widened, and the open bottom sections of the gas corridors allow for easy cleaning without disassembly. The apparatus 400 for gas bubble delivery might be configured such that the gas bubble divider edge 430 radius R is approximately equal to the distance between corridor side walls 490 and 495. The apparatus 400 for gas bubble delivery might have a radius R of gas bubble divider edge 420, 430 of approximately 1-10 mm. The apparatus 400 for gas bubble delivery might have a radius R of gas bubble divider edge 420, 430 of approximately 10-50 mm. The apparatus 400 for gas bubble delivery might have corridor upper surfaces 440, 445 which slope upwards as the gas bubble travel distance increases farther from the gas-supply-section 410. The apparatus 400 for gas bubble delivery might also further comprise a gas supply component 250 terminating in a gas supply inlet 255, a coupling mechanism 260, the coupling mechanism to align the gas supply inlet 255 with the gas-supply-section 410 such that gas bubbles 101 emitted from the gas supply inlet 255 are directed to travel into the gas-supply-section 410. The apparatus 400 for gas bubble delivery might have a diameter of gas outlet 450 of 5-10 mm.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. An apparatus for gas bubble delivery to an upflow algae scrubber, comprising:
a gas bubble dividing component defining a first surface, the first surface terminating in a first gas bubble divider edge configured to divide an upflowing mixture of water and gas bubbles into two portions, a first portion of which would travel along and be guided by the first surface to a first section of the upflow algae scrubber.

2. The apparatus for gas bubble delivery of claim 1, wherein the gas bubble dividing component further defines a second surface terminating in the first edge, the second surface configured to allow a second portion of water and gas bubble mixture to flow along and be guided by the second surface to a second section of the upflow algae scrubber.

3. The apparatus for gas bubble delivery of claim 1, wherein the gas bubble dividing component further defines a third surface terminating in a second gas bubble divider edge, the third surface intersecting the first surface, and the second gas bubble divider edge configured to divide a first portion of water and gas bubble mixture into two smaller portions, such that each smaller portion would be directed to a different section of the upflow algae scrubber.

4. The apparatus for gas bubble delivery of claim 1, further comprising:
a gas supply component terminating in a gas supply inlet; and
a coupling mechanism, the coupling mechanism to align the gas supply inlet with the first gas bubble divider edge such that gas bubbles emitted from the gas supply inlet are directed to travel to the first gas bubble divider edge.

5. The apparatus for gas bubble delivery of claim 1, wherein the radius R of the gas bubble divider edge is approximately 1-10 mm.

6. An apparatus for gas bubble delivery to an upflow algae scrubber, comprising:
a gas bubble dividing component defining a first set of upper surfaces, each upper surface terminating in a gas bubble divider edge positioned approximately above or below another gas bubble divider edge, and each gas bubble divider edge configured to divide an upflowing mixture of water and gas bubbles into a first set of portions which would be guided by the first set of upper surfaces into separate sections of the upflow algae scrubber.

7. The apparatus for gas bubble delivery of claim 6, wherein gas bubble divider edges which are progressively higher in the first set of gas bubble divider edges are positioned progressively farther towards the center of the area configured to accept an upflowing water and gas bubble mixture than lower gas bubble divider edges are placed.

8. The apparatus for gas bubble delivery of claim 6, wherein the first set of upper surfaces are approximately horizontal in both planes.

9. The apparatus for gas bubble delivery of claim 6, wherein the first set of upper surfaces are sloped upwards as the distance increases from the center of the area configured to accept an upflowing water and gas bubble mixture.

10. The apparatus for gas bubble delivery of claim 6, wherein the gas bubble dividing component further defines a second set of upper surfaces, each upper surface terminating in a gas bubble divider edge positioned approximately above or below another gas bubble divider edge, and each gas bubble divider edge configured to further divide an upflowing mixture of water and gas bubbles into a second set of portions which would be guided by the second set of upper surfaces into separate sections of the upflow algae scrubber.

11. The apparatus for gas bubble delivery of claim 6, wherein the front of each upper surface is to be operated while placed against a transparent or translucent wall.

12. The apparatus for gas bubble delivery of claim 6, wherein the radius R of gas bubble divider edges is approximately 1-10 mm.

13. The apparatus for gas bubble delivery of claim 6, further comprising:
a gas supply component terminating in a gas supply inlet; and
a coupling mechanism, the coupling mechanism to align the gas supply inlet with the first set of gas bubble divider edges such that gas bubbles emitted from the gas supply inlet are directed to travel to the first set of gas bubble divider edges.

14. An apparatus for gas bubble delivery to an upflow algae scrubber, comprising:
a gas bubble dividing component defining a set of corridor upper surfaces, each corridor upper surface configured to be capable of fluid communication with a gas-supply-section upper surface, and each corridor upper surface having two attached corridor side surfaces each terminating in a gas bubble divider edge at the gas-supply-section upper surface and configured to divide upflowing gas bubbles at the gas-supply-section upper surface into separate portions by the gas bubble divider edges such that each portion of gas bubbles would be directed by the corridor side surfaces to travel along the corridor upper surface in a pathway from the gas-supply-section upper surface to a gas bubble outlet.

15. The apparatus for gas bubble delivery of claim 14, wherein the gas bubble divider edge radius R is approximately equal to the distance between corridor side walls.

16. The apparatus for gas bubble delivery of claim 14, wherein the radius R of gas bubble divider edges is approximately 1-10 mm.

17. The apparatus for gas bubble delivery of claim 14, wherein the radius R of gas bubble divider edges is approximately 10-50 mm.

18. The apparatus for gas bubble delivery of claim 14, wherein the corridor upper surfaces slope upwards as the gas bubble travel distance increases farther from the gas-supply-section.

19. The apparatus for gas bubble delivery of claim 14, further comprising:
a gas supply component terminating in a gas supply inlet; and
a coupling mechanism, the coupling mechanism to align the gas supply inlet with the gas-supply-section such that gas bubbles emitted from the gas supply inlet are directed to travel into the gas-supply-section.

20. The apparatus for gas bubble delivery of claim 14, wherein the diameter of gas outlets is approximately 5-10 mm.

* * * * *